United States Patent
Kushibiki

(10) Patent No.: US 12,304,506 B2
(45) Date of Patent: May 20, 2025

(54) DRIVING DIAGNOSTIC DEVICE, DRIVING DIAGNOSTIC METHOD, AND STORAGE MEDIUM

(71) Applicant: TOYOTA JIDOSHA KABUSHIKI KAISHA, Aichi-ken (JP)

(72) Inventor: Yukiya Kushibiki, Gifu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 227 days.

(21) Appl. No.: 18/178,458

(22) Filed: Mar. 3, 2023

(65) Prior Publication Data
US 2023/0322239 A1    Oct. 12, 2023

(30) Foreign Application Priority Data

Apr. 12, 2022    (JP) ................. 2022-065905

(51) Int. Cl.
*B60W 50/02* (2012.01)
*B60W 50/04* (2006.01)

(52) U.S. Cl.
CPC ............ *B60W 50/02* (2013.01); *B60W 50/04* (2013.01); *B60W 2420/00* (2013.01); *B60W 2520/105* (2013.01); *B60W 2540/18* (2013.01)

(58) Field of Classification Search
CPC .. B60W 50/02; B60W 50/04; B60W 2420/00; B60W 2520/105; B60W 2540/18; B60W 40/10; B60W 40/09; B60W 2520/10; B60W 2520/12; B60W 2520/125
See application file for complete search history.

(56) References Cited

U.S. PATENT DOCUMENTS

| | | | |
|---|---|---|---|
| 2018/0106882 A1* | 4/2018 | Kanaga | G01S 11/06 |
| 2019/0143815 A1* | 5/2019 | Sato | B60K 35/00 |
| | | | 340/439 |
| 2021/0335061 A1* | 10/2021 | Claessens | G07C 5/0816 |
| 2023/0259130 A1* | 8/2023 | Suehiro | G05D 1/0022 |
| | | | 701/2 |

FOREIGN PATENT DOCUMENTS

| | | |
|---|---|---|
| JP | 2007-207068 A | 8/2007 |
| JP | 2008290496 A | 12/2008 |
| JP | 2010-182211 A | 8/2010 |
| JP | 2016-057490 A | 4/2016 |
| JP | 2017-068708 A | 4/2017 |

* cited by examiner

*Primary Examiner* — Russell Frejd
*Assistant Examiner* — Ana D Thomas
(74) *Attorney, Agent, or Firm* — HAUPTMAN HAM, LLP

(57) ABSTRACT

The driving diagnostic device includes a processor, in which the processor acquires state information indicating an open or closed state of a door of a vehicle from a sensor mounted on the vehicle, determines that there is an event that indicates a change in the state when the state information satisfies a predetermined condition, and evaluates a driving operation of the vehicle in a predetermined period of time associated with the event.

20 Claims, 6 Drawing Sheets

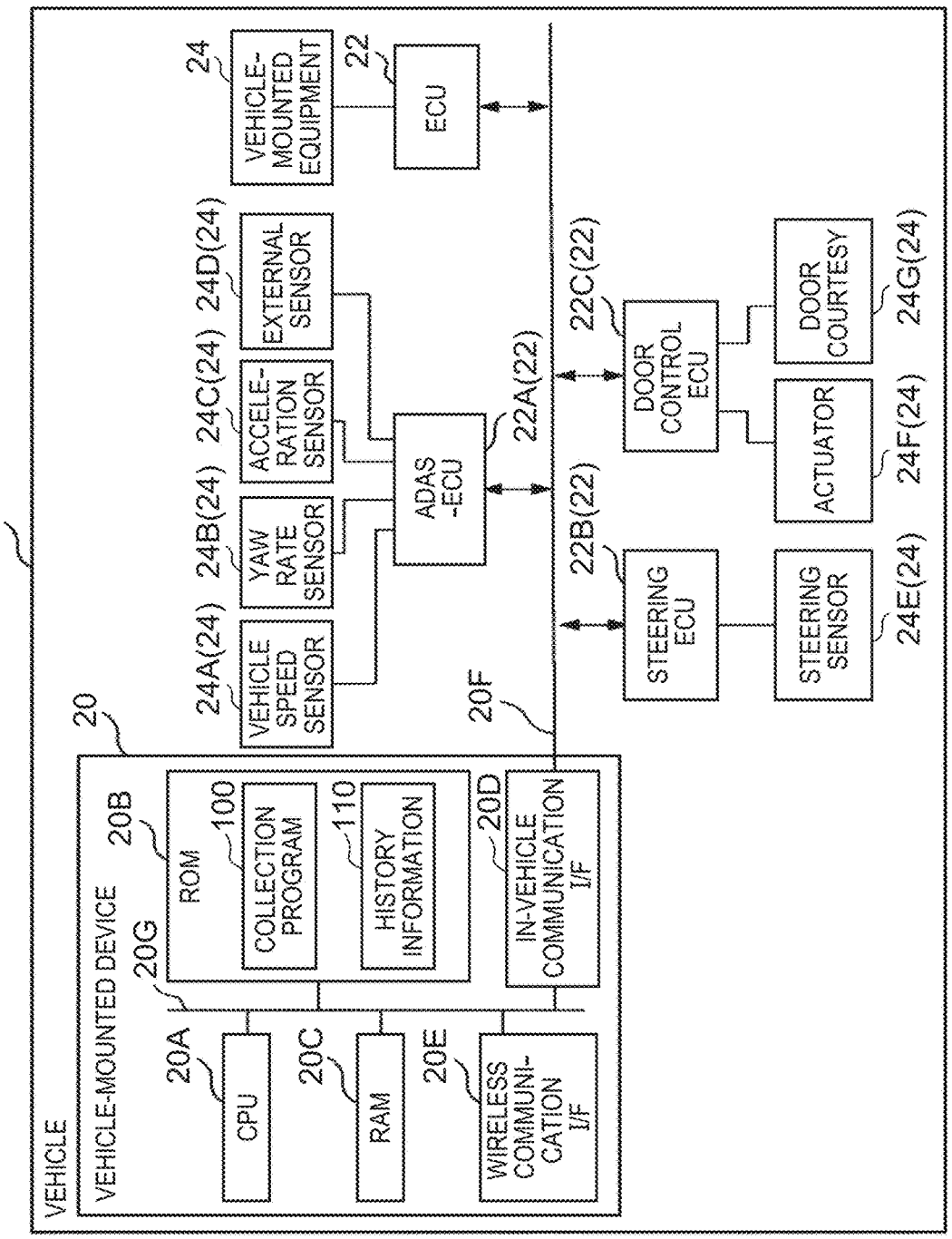
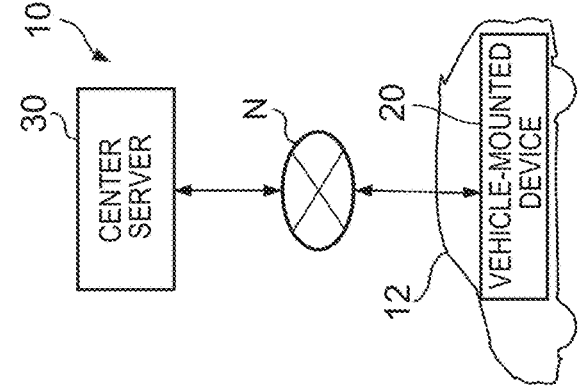

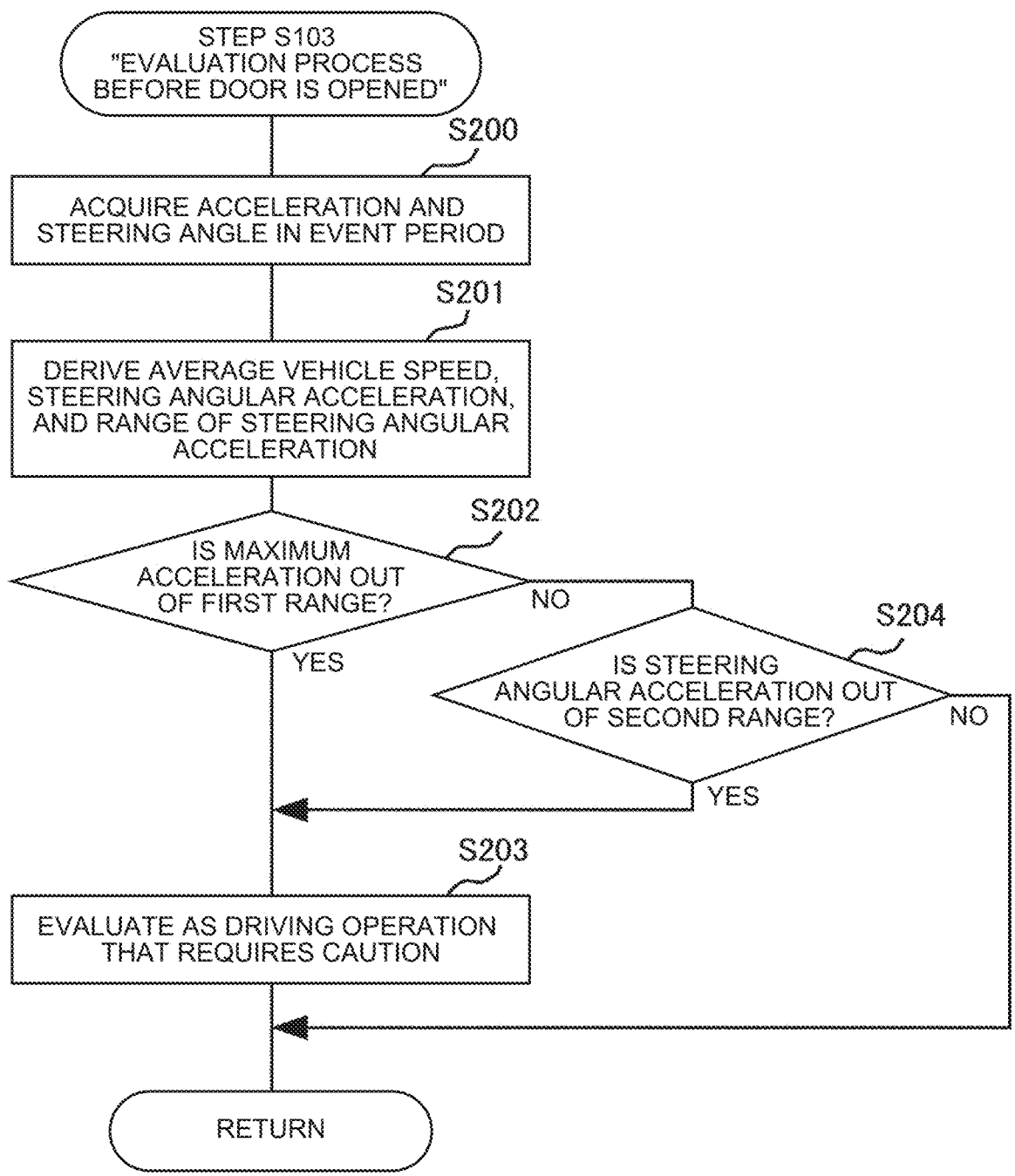

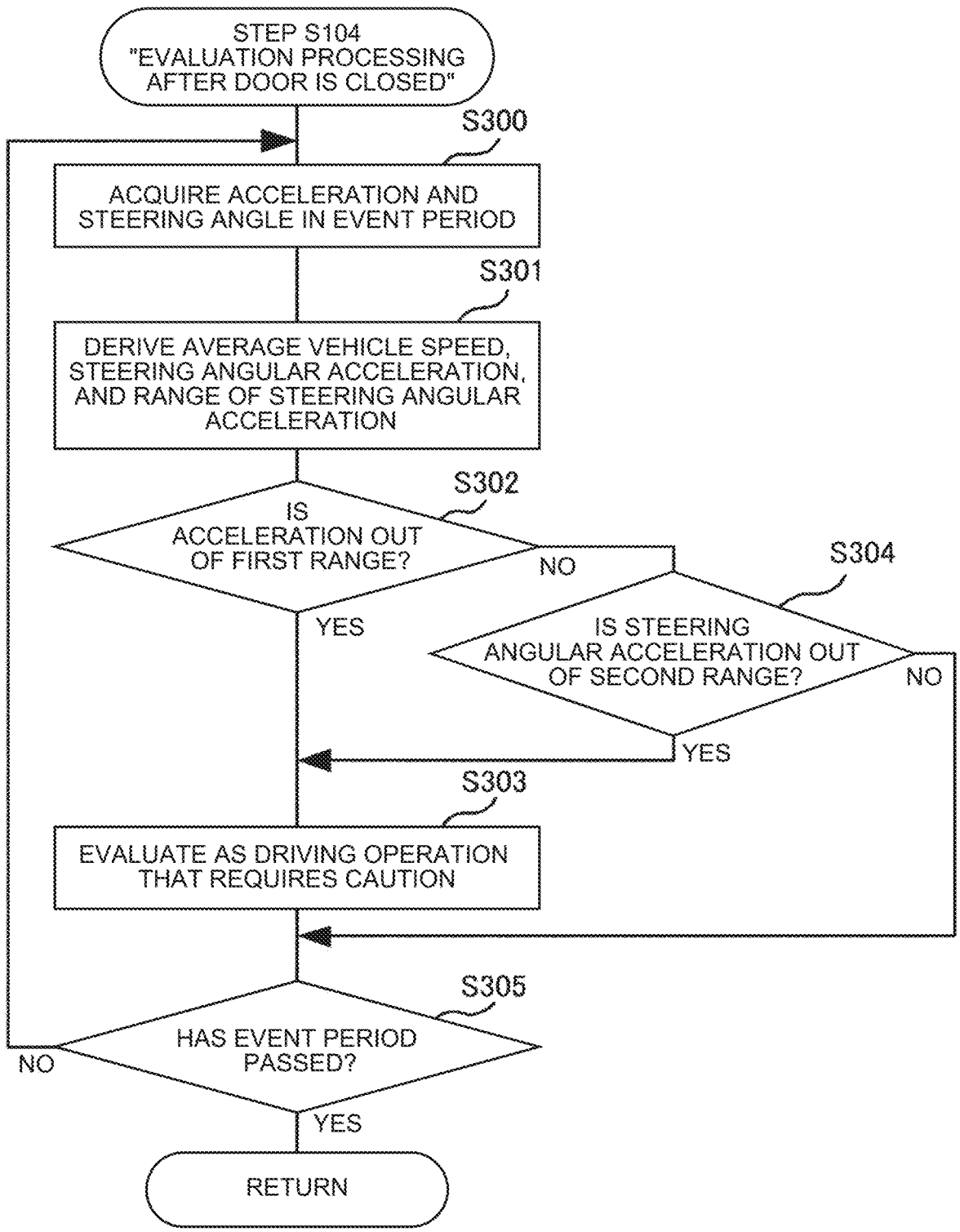

DRIVING DIAGNOSTIC DEVICE, DRIVING DIAGNOSTIC METHOD, AND STORAGE MEDIUM

CROSS-REFERENCE TO RELATED APPLICATION

This application claims priority to Japanese Patent Application No. 2022-065905 filed on Apr. 12, 2022, incorporated herein by reference in its entirety.

BACKGROUND

1. Technical Field

The present disclosure relates to a driving diagnostic device, a driving diagnostic method, and a storage medium that diagnose whether a vehicle is being driven with sudden starts and stops when doors of the vehicle are opened and closed.

2. Description of Related Art

Japanese Unexamined Patent Application Publication No. 2008-290496 (JP 2008-290496 A) discloses an operation control device that performs deceleration control of a vehicle when a possibility of an occupant falling from a door in a state where the door of the vehicle is improperly closed is detected.

SUMMARY

However, the related art only detects the possibility of the occupant falling from the door that is improperly closed. Thus, it is not always that the related art can evaluate driving before and after the door is opened and closed to detect driving that requires caution and hinders safe driving.

The present disclosure provides a driving diagnostic device, a driving diagnostic method, and a storage medium that can evaluate driving before and after a door is opened and closed, and detect driving that requires caution and that hinders safe driving.

A driving diagnostic device according to claim 1 includes a processor, in which the processor acquires state information indicating an open or closed state of a door of a vehicle from a sensor mounted on the vehicle, determines that there is an event that indicates a change in the state when the state information satisfies a predetermined condition, and evaluates a driving operation of the vehicle in a predetermined period of time associated with the event.

The driving diagnostic device according to claim 1 acquires the state information indicating the state of opening and closing of the door, detects the event indicating opening or closing of the door by using the state information, and performs the driving diagnosis in the event period until the door is opened or in the event period after the door is closed. As a result, it is possible to evaluate driving before and after the door is opened and closed, and to detect driving that requires caution and that hinders safe driving.

In the driving diagnostic device according to claim 2, in the driving diagnostic device according to claim 1, the predetermined condition is a state in which the door changes from a closed state to an open state, and the processor: determines that there is the event when the predetermined condition is satisfied; and evaluates the driving operation with a predetermined period until the event occurs serving as a target period.

With the driving diagnostic device according to claim 2, the event before the door is opened can be clearly detected and evaluated.

In the driving diagnostic device according to claim 3, in the driving diagnostic device according to claim 1, the predetermined condition is a state in which the door changes from an open state to a closed state, and the processor: determines that there is the event when the predetermined condition is satisfied; and evaluates the driving operation with a predetermined period after the event occurs serving as a target period.

With the driving diagnostic device according to claim 3, the event after the door is closed can be clearly detected and evaluated.

In the driving diagnostic device according to claim 4, in the driving diagnostic device according to claim 1, the processor: further acquires vehicle operation information indicating an operation of the vehicle and including an acceleration of the vehicle; and evaluates the driving operation as a driving operation that requires caution when the acceleration is outside a predetermined first range.

With the driving diagnostic device according to claim 4, it is possible to detect the vehicle operation that hinders safe driving.

In the driving diagnostic device according to claim 5, in the driving diagnostic device according to claim 1, the processor: further acquires vehicle operation information indicating an operation of the vehicle and including a steering angle; derives a steering angular acceleration indicating an acceleration of the steering angle from the vehicle operation information; and evaluates the driving operation as a driving operation that requires caution when the steering angular acceleration is outside a second range.

With the driving diagnostic device according to claim 5, it is possible to detect the vehicle operation that hinders safe driving.

In the driving diagnostic device according to claim 6, in the driving diagnostic device according to claim 5, the processor: further acquires vehicle operation information indicating an operation of the vehicle and including an acceleration of the vehicle; and evaluates the driving operation as a driving operation that requires caution when the acceleration is outside a predetermined first range and when the steering angular acceleration is outside the second range.

According to the driving diagnostic device of claim 6, it is possible to detect the vehicle operation that requires further caution.

In the driving diagnostic device according to claim 7, in the driving diagnostic device according to claim 5 or 6, the vehicle operation information further includes a vehicle speed of the vehicle, and the processor sets the second range in accordance with an average value of the vehicle speed.

With the driving diagnostic device according to claim 7, even when the evaluation fluctuates in accordance with the vehicle speed, it is possible to clearly detect the vehicle operation that hinders safe driving.

In the driving diagnostic device according to claim 8, in the driving diagnostic device according to claim 1, when the processor detects that the state information is an open state and detects a state in which the vehicle is traveling, the processor performs notification that the vehicle is traveling in a state in which the door is open.

With the driving diagnostic device according to claim 8, it is possible to recognize the vehicle operation that hinders safe driving.

In the driving diagnostic method according to claim 9, a computer executes processes including: acquiring state information indicating an open or closed state of a door of a vehicle from a sensor mounted on the vehicle; determining that there is an event that indicates a change in the state when the state information satisfies a predetermined condition; and evaluating a driving operation of the vehicle in a predetermined period of time associated with the event.

The driving diagnostic method according to claim 9 acquires the state information indicating the state of opening and closing of the door, detects the event indicating opening or closing of the door by using the state information, and performs the driving diagnosis in the event period until the door is opened or in the event period after the door is closed. As a result, it is possible to evaluate driving before and after the door is opened and closed, and to detect driving that requires caution and that hinders safe driving.

A storage medium according to claim 10 stores a driving diagnostic program causes a computer to execute processes including: acquiring state information indicating an open or closed state of a door of a vehicle from a sensor mounted on the vehicle; determining that there is an event that indicates a change in the state when the state information satisfies a predetermined condition; and evaluating a driving operation of the vehicle in a predetermined period of time associated with the event.

The computer that executes the driving diagnostic program stored in the storage medium according to claim 10, acquires the state information indicating the state of opening and closing of the door, detects the event indicating opening or closing of the door by using the state information, and performs the driving diagnosis in the event period until the door is opened or in the event period after the door is closed. As a result, it is possible to evaluate driving before and after the door is opened and closed, and to detect driving that requires caution and that hinders safe driving.

According to the present disclosure, it is possible to evaluate driving before and after the door is opened and closed, and to detect driving that requires caution and that hinders safe driving.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram showing a schematic configuration of a driving diagnostic system according to an embodiment;

FIG. 2 is a block diagram showing a hardware configuration of a vehicle according to the embodiment;

FIG. 8 is a flowchart showing a flow of an evaluation process before the door is opened that is executed in the center server according to the embodiment; and FIG. 9 is a flowchart showing a flow of an evaluation process after the door is closed that is executed in the center server according to the embodiment.

DETAILED DESCRIPTION OF EMBODIMENTS

Figure 3:
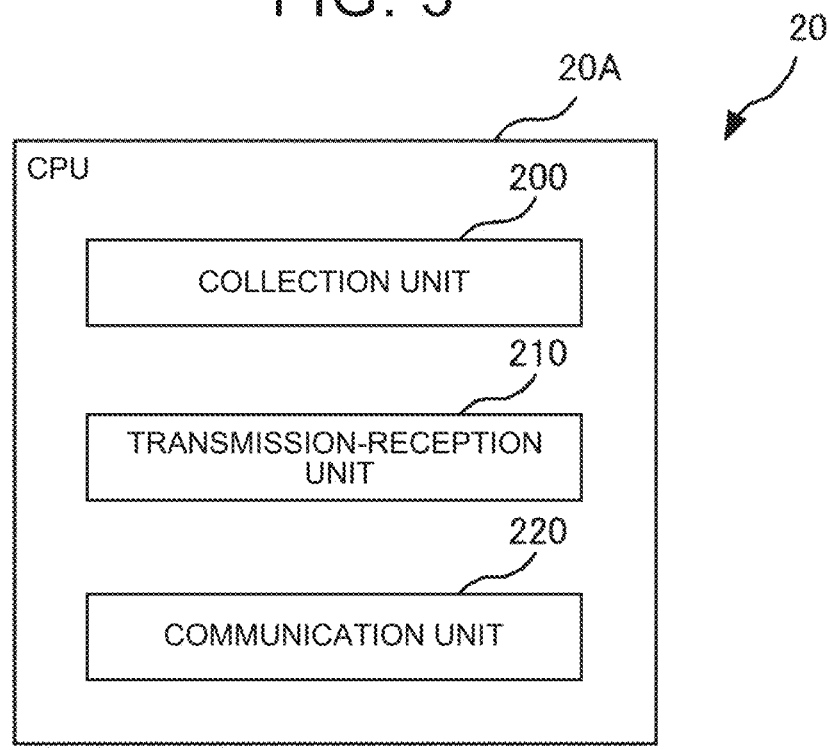
FIG. 3 is a block diagram showing a functional configuration of an vehicle-mounted device according to the embodiment.

A driving diagnostic system including a driving diagnostic device of the present disclosure will be described. The driving diagnostic system is a system that uses information indicating the open/closed state of a vehicle door (hereinafter referred to as "state information") acquired from a vehicle-mounted device installed in a vehicle to detect an event period until the vehicle door is opened, or an event period after the door is closed. In addition, the driving diagnostic system evaluates an operation of the vehicle during the event period by using information related to the operation of the vehicle (hereinafter referred to as "vehicle operation information").

Overall Structure

As shown in FIG. 1, a driving diagnostic system 10 according to an embodiment of the present disclosure includes a vehicle 12, and a center server 30 serving as a driving diagnostic device. A vehicle-mounted device 20 is mounted on the vehicle 12, and the vehicle-mounted device 20 is mutually connected to the center server 30 through a network N.

Although FIG. 1 shows one vehicle 12 including one vehicle-mounted device 20 with respect to one center server 30, the numbers of the vehicles 12, the vehicle-mounted device 20, and the center server 30 are not limited to this.

The vehicle-mounted device 20 is a device that acquires the state information indicating the open/closed state of the door and the vehicle operation information regarding the operation of the vehicle 12, and that transmits the information to the center server 30. Here, the state information and the vehicle operation information according to the present embodiment are time-series data of feature amounts detected from each device mounted on the vehicle 12. For example, the state information according to the present embodiment is time-series data of a courtesy signal detected from the vehicle, and the vehicle operation information is time-series data related to operation of the vehicle 12 such as a vehicle speed, an acceleration, and a steering angle of the vehicle. Here, the courtesy signal is a signal in conjunction with the opening/closing of the door and indicating the open/closed state.

The center server 30 is installed in, for example, a manufacturer that manufactures the vehicle 12 or a car dealer affiliated with the manufacturer. The center server 30 acquires the state information and the vehicle operation information from the vehicle-mounted device 20, detects an event before the vehicle door opens and an event after the vehicle door closes, and evaluates the vehicle operation during the event period. Here, the event period according to this embodiment is, for example, a predetermined period such as 10 seconds.

Vehicle

As shown in FIG. 2, the vehicle 12 according to the present embodiment includes the vehicle-mounted device 20, a plurality of electronic control units (ECUs) 22, and a plurality of vehicle-mounted equipment 24.

The vehicle-mounted device 20 includes a central processing unit (CPU) 20A, a read-only memory (ROM) 20B, a random access memory (RAM) 20C, an in-vehicle communication interface (I/F) 20D, and a wireless communication I/F 20E. The CPU 20A, the ROM 20B, the RAM 20C, the in-vehicle communication I/F 20D, and the wireless communication I/F 20E are connected so as to be able to communicate with each other via an internal bus 20G.

The CPU 20A is a central processing unit that executes various programs and controls various units. That is, the CPU 20A reads the program from the ROM 20B and executes the program using the RAM 20C as a work area.

The ROM 20B stores various programs and various data. The ROM 20B of the present embodiment stores a collection program 100 for collecting the vehicle operation information related to the driving operation of the vehicle 12 from the ECU 22. Along with execution of the collection program 100, the vehicle-mounted device 20 executes processing for transmitting the vehicle operation information to the center server 30. Further, the ROM 20B stores history information 110 that is backup data of the vehicle operation information. The RAM 20C temporarily stores a program or data as a work area.

An in-vehicle communication I/F 20D is an interface for connecting to each of the ECUs 22. For the interface, a communication standard based on a controller area network (CAN) protocol is used. The in-vehicle communication I/F 20D is connected to an external bus 20F.

The wireless communication I/F 20E is a wireless communication module for communicating with the center server 30. For the wireless communication module, for example, communication standards such as fifth generation (5G), long term evolution (LTE), and Wi-Fi (registered trademark) are used. The wireless communication I/F 20E is connected to the network N.

The ECU 22 includes at least an ADAS (Advanced Driver Assistance System)-ECU 22A, a steering ECU 22B, and a door control ECU 22C.

The ADAS-ECU 22A controls an advanced driver assistance system in an integrated manner. A vehicle speed sensor 24A, a yaw rate sensor 24B, an acceleration sensor 24C, and an external sensor 24D that constitute the vehicle-mounted equipment 24 are connected to the ADAS-ECU 22A. The vehicle speed sensor 24A is a sensor that detects the speed of the vehicle, the yaw rate sensor 24B is a sensor that detects the angular velocity in turning of the vehicle, and the acceleration sensor 24C is a sensor that detects the acceleration in a traveling direction of the vehicle. The external sensor 24D is a group of sensors used for detecting the surrounding environment of the vehicle 12. The external sensor 24D includes, for example, a camera that captures images of surrounding areas of the vehicle 12, a millimeter-wave radar that transmits an exploration wave and receives a reflective wave, a laser imaging detection and ranging (LiDAR) that scans a front area of the vehicle 12, and the like.

The steering ECU 22B controls power steering. A steering sensor 24E that constitutes the vehicle-mounted equipment 24 is connected to the steering ECU 22B. The steering sensor 24E is a sensor that detects the steering angle of the steering wheel.

The door control ECU 22C controls opening and closing of the door of the vehicle 12. The door control ECU 22C is connected to an actuator 24F and a door courtesy 24G. The actuator 24F opens and closes the vehicle door under the control of the door control ECU 22C. The door courtesy 24G is a sensor that detects the open/closed state of the door.

As shown in FIG. 3, in the vehicle-mounted device 20 according to the present embodiment, the CPU 20A functions as a collection unit 200, a transmission-reception unit 210, and a notification unit 220 by executing the collection program 100.

The collection unit 200 has a function of acquiring information detected by the vehicle-mounted equipment 24 from each ECU 22 of the vehicle 12 and collecting the state information and the vehicle operation information.

The transmission-reception unit 210 has a function of outputting the state information and the vehicle operation information collected by the collection unit 200 to the center server 30. Further, the transmission-reception unit 210 has a function of receiving a notification from the center server 30.

The notification unit 220 has a function of displaying a notification received from the center server 30 on a monitor (not shown) to notify the user.

Center Server

Figure 4:
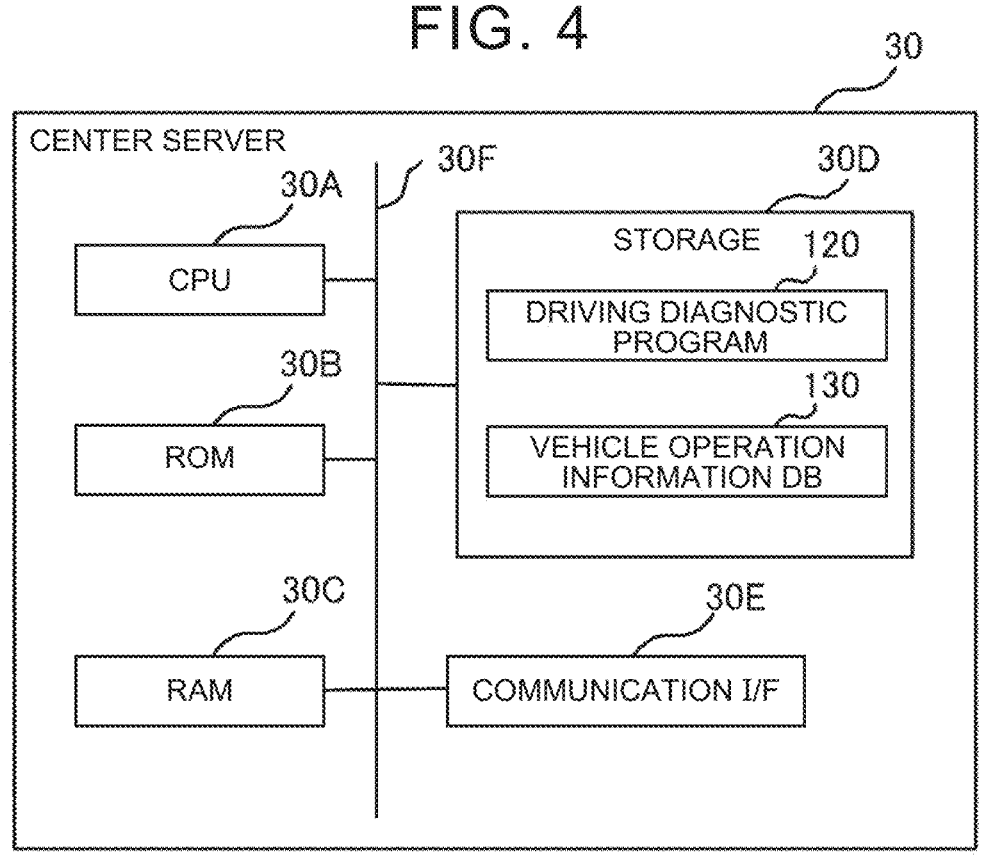
FIG. 4 is a block diagram showing a hardware configuration of a center server according to the embodiment.

As shown in FIG. 4, the center server 30 includes a CPU 30A, a ROM 30B, a RAM 30C, a storage 30D, and a communication I/F 30E. The CPU 30A, the ROM 30B, the RAM 30C, the storage 30D, and the communication I/F 30E are connected so as to be able to communicate with each other via an internal bus 30F. The functions of the CPU 30A, the ROM 30B, the RAM 30C and the communication I/F 30E are the same as those of the CPU 20A, the ROM 20B, the RAM 20C and the wireless communication I/F 20E of the vehicle-mounted device 20 described above. The communication I/F 30E may perform wired communication.

The storage 30D as a memory is composed of a hard disk drive (HDD) or a solid state drive (SSD), and stores various programs and various data. A driving diagnostic program 120 and a vehicle operation information database (hereinafter referred to as a "vehicle operation information DB") 130 are stored in the storage 30D of the present embodiment. The ROM 30B may store the driving diagnostic program 120 and the vehicle operation information DB 130.

The driving diagnostic program 120 serving as a program is a program for controlling the center server 30. In accordance with the execution of the driving diagnostic program 120, the center server 30 executes each process including the process of detecting an event from the state information and the process of evaluating the operation of the vehicle.

The vehicle operation information DB 130 stores that state information and the vehicle operation information received from the vehicle-mounted device 20 and the evaluation results acquired by using the vehicle operation information.

Figures 5, 6:
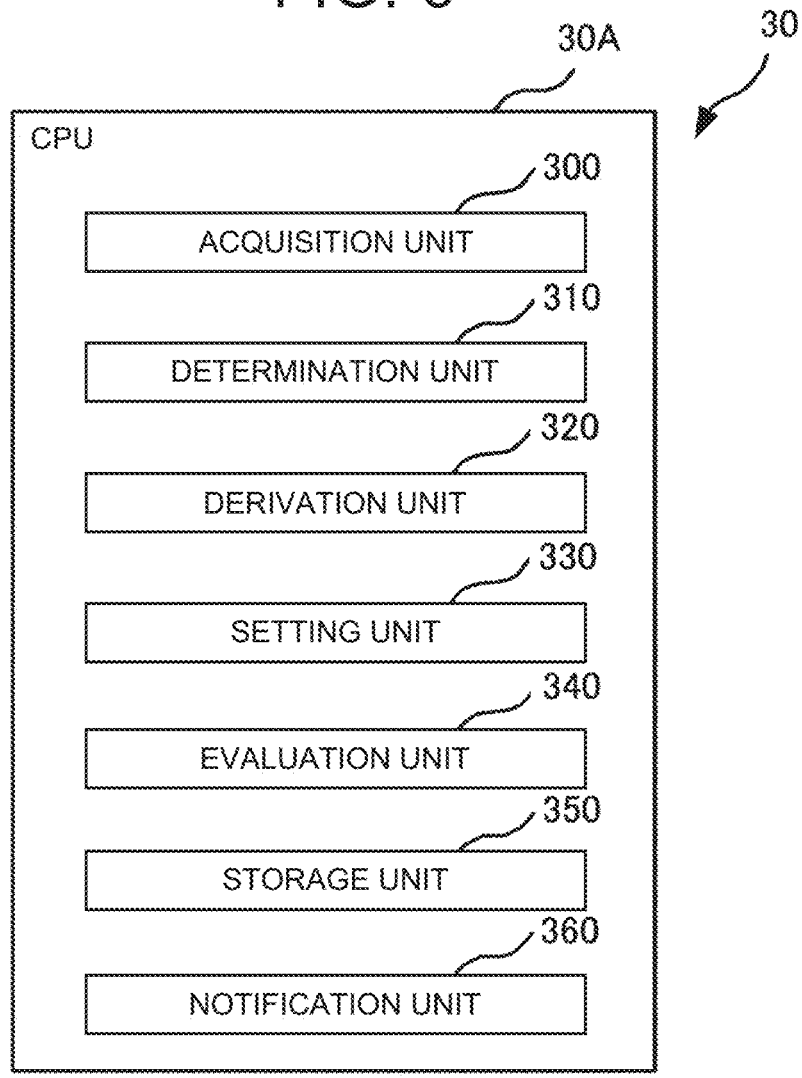
FIG. 5 is a block diagram showing a functional configuration of the center server according to the embodiment.
FIG. 6 is a diagram showing an example of a range of a relationship between an average vehicle speed and a steering angular acceleration for explaining derivation of a range of a steering angular acceleration according to the embodiment.

As shown in FIG. 5, in the center server 30 of the present embodiment, the CPU 30A executes the driving diagnostic program 120 to function as an acquisition unit 300, a determination unit 310, a derivation unit 320, a setting unit 330, an evaluation unit 340, a storage unit 350, and a notification unit 360.

The acquisition unit 300 has a function of acquiring the state information and the vehicle operation information of the vehicle 12 from the vehicle-mounted device 20 of the vehicle 12. Here, the acquisition unit 300 according to the present embodiment acquires time-series data of the courtesy signal as the state information, and acquires time-series data related to the vehicle speed, the acceleration, and the steering angle of the vehicle as the vehicle operation information. The acceleration according to the present embodiment is a positive acceleration that accelerates in the traveling direction and a negative acceleration that decelerates in the traveling direction. Further, regarding the steering angle according to the present embodiment, a direction in which the vehicle turns left is the positive direction, and a direction in which the vehicle turns right is the negative direction.

The determination unit 310 uses the acquired state information to determine whether the door is opened or closed, and detects an event. Further, the determination unit 310 determines whether the vehicle is traveling with the door opened, by using the acquired state information and the vehicle operation information.

For example, when the determination unit 310 detects that the door has changed from the closed state to the open state by using the state information, the determination unit 310 determines that the door has been opened, and detects a door opening event. Further, when the determination unit 310 detects that the door has changed from the open state to the closed state, the determination unit 310 determines that the door is closed, and detects a door closing event.

Further, when the state information is in the open state and the vehicle speed included in the vehicle operation information exceeds 0 km/h (the vehicle is traveling), the determination unit 310 determines that the vehicle is traveling while the door is open.

When each of the events is detected, the derivation unit 320 uses the vehicle operation information to derive each of the average vehicle speed, the steering angular acceleration, and the steering angular acceleration threshold of the vehicle during each of the event periods. For example, the derivation unit 320 uses the vehicle speed included in the vehicle operation information to derive the average vehicle speed during the event period, and uses the steering angle included in the vehicle operation information to derive the steering angular acceleration. Here, the steering angular acceleration is derived by second-order differentiation of the time-series data relating to the steering angle.

The setting unit 330 sets the range (second range) of the steering angular acceleration according to the derived average vehicle speed. As an example, as shown in FIG. 6, the range of the steering angular acceleration threshold is set such that the second range becomes smaller as the average vehicle speed increases. For example, as shown in FIG. 6, the setting unit 330 sets the second range from $-300$ deg/s$^2$ to 300 deg/s$^2$ when the average vehicle speed exceeds 0 km/h and is 10 km/h or less. When the average vehicle speed is over 10 km/h and 20 km/h or less, the setting unit 330 sets the second range from $-220$ deg/s$^2$ to 220 deg/s$^2$, and when the average vehicle speed exceeds 20 km/h and is 30 km/h or less, the setting unit 330 sets the second range to $-150$ deg/s$^2$ to 150 deg/s$^2$.

The evaluation unit 340 evaluates the driving operation during the event period. For example, when the acceleration included of the vehicle 12 is outside the predetermined first range, the evaluation unit 340 evaluates that the driving operation requires caution. In addition, when the steering angular acceleration derived from the steering angle included in the vehicle operation information is outside the derived second range, evaluation unit 340 evaluates the driving operation that requires caution. Here, the first range is, for example, a range from $-2.5$ m/s$^2$ to 2.5 m/s$^2$. Further, the event period related to opening the door is a period (for example, 10 seconds) until the door is opened that is predetermined for the vehicle 12, and the event period related to closing the door is until a period (for example, 10 seconds) that is determined for the vehicle 12 elapses after the door is closed.

The storage unit 350 stores the state information, the vehicle operation information, and the evaluation result evaluated by the evaluation unit 340 in the vehicle operation information DB 130.

When the determination unit 310 determines that the vehicle is traveling with the door open, the notification unit 360 transmits a notification to the vehicle-mounted device 20 that the vehicle is traveling with the door open.

Flow of Control

Figure 7:
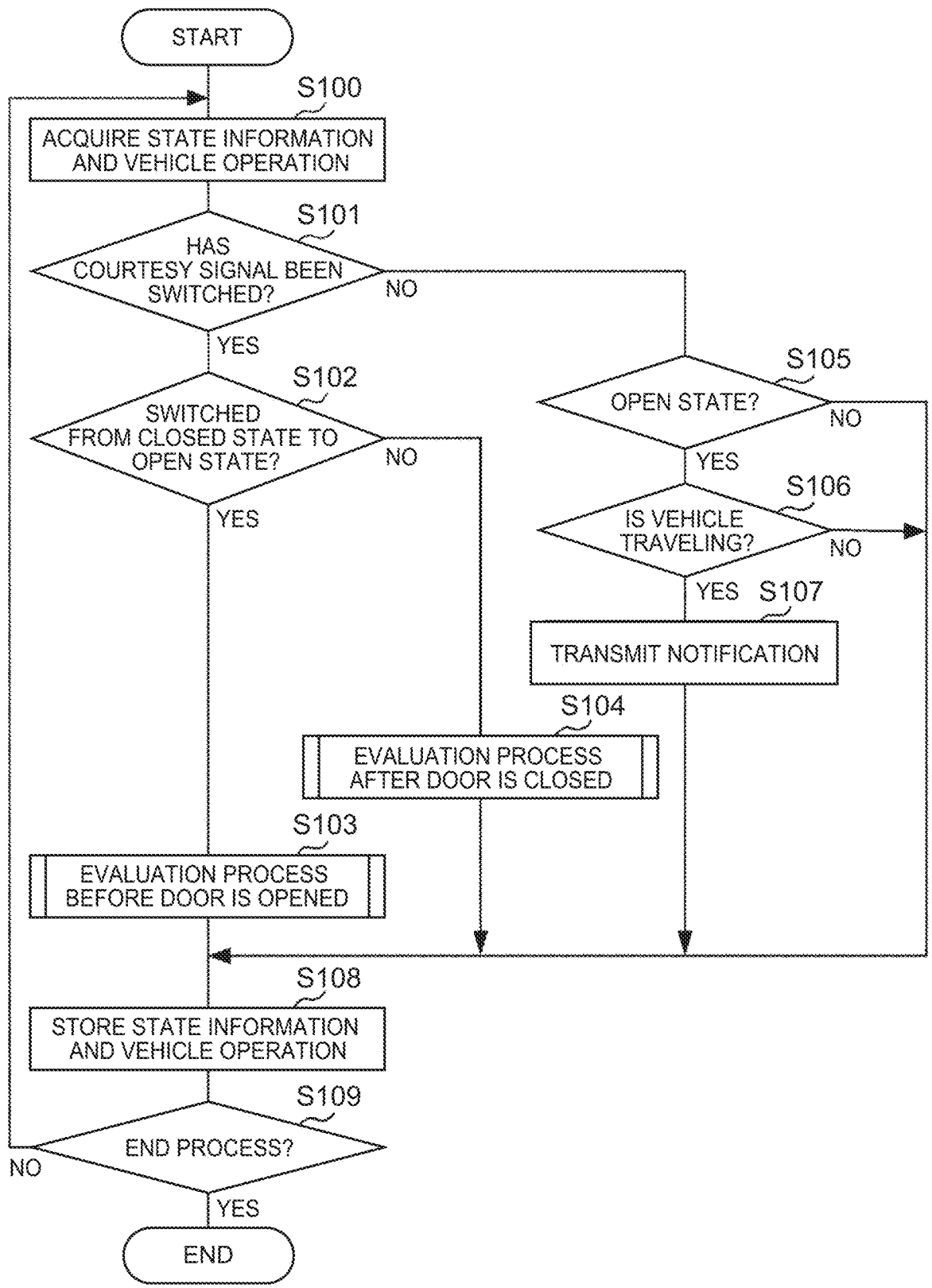
FIG. 7 is a flowchart showing a flow of a driving diagnosis process executed in a center server according to the embodiment.

The flow of each process executed by the driving diagnostic system 10 of the present embodiment will be described with reference to the flowchart of FIGS. 7 to 9. Each process in the center server 30 is executed by the CPU 30A of the center server 30 functioning as the acquisition unit 300, the determination unit 310, the derivation unit 320, the setting unit 330, the evaluation unit 340, the storage unit 350, and the notification unit 360. The process for detecting an event shown in FIG. 7 is executed, for example, when an instruction to detect an event is input.

In step S100, the CPU 30A acquires state information and vehicle operation information. Here, the CPU 30A acquires the courtesy signal as the state information, and acquires the vehicle speed, the acceleration, and the steering angle of the vehicle 12 as the vehicle operation information.

In step S101, the CPU 30A determines whether the courtesy signal has been switched by using the state information. When the courtesy signal has been switched (step S101: YES), the CPU 30A proceeds to step S102. On the other hand, when the courtesy signal has not been switched (step S101: NO), the CPU 30A proceeds to step S105.

In step S102, the CPU 30A determines whether the courtesy signal has been switched from the closed state to the open state by using the state information. When the courtesy signal has been switched from the closed state to the open state (step S102: YES), the CPU 30A proceeds to step S103. On the other hand, when the courtesy signal has not been switched from the closed state to the open state (the courtesy signal has been switched from the open state to the closed state) (step S102: NO), the CPU 30A proceeds to step S104.

In step S103, the CPU 30A detects an opening event of the door and performs the evaluation process before opening the door. The evaluation process before opening the door will be described in detail with reference to FIG. 8, which will be described later.

In step S104, the CPU 30A detects a closing event of the door and performs the evaluation process after closing the door. The evaluation process after closing the door will be described in detail with reference to FIG. 9, which will be described later.

In step S105, the CPU 30A determines whether the courtesy signal is the open state by using the state information. When the courtesy signal is the open state (step S105: YES), the CPU 30A proceeds to step S106. On the other hand, when the courtesy signal is not the open state (the courtesy signal is the closed state) (step S105: NO), the CPU 30A proceeds to step S108.

In step S106, the CPU 30A determines whether the vehicle is traveling. When the vehicle is traveling (vehicle speed exceeds 0 km/h) (step S106: YES), the CPU 30A proceeds to step S107. On the other hand, when the vehicle is not traveling (the vehicle speed is 0 km/h) (step S106: NO), the CPU 30A proceeds to step S108.

In step S107, the CPU 30A transmits a notification that the vehicle is traveling with the door open to the vehicle-mounted device 20.

In step S108, the CPU 30A stores the state information and the vehicle operation information in vehicle operation information DB 130. When each evaluation process is performed, the CPU 30A associates and stores the evaluation result together with the state information and the vehicle operation information.

In step S109, the CPU 30A determines whether to end the process of detecting an event. When the process of detecting an event is to be ended (step S109: YES), the CPU 30A ends the process of detecting an event. On the other hand, when the process of detecting an event is not to be ended (step S109: NO), the CPU 30A proceeds to step S100 and acquires the state information and the vehicle operation information.

The process of evaluating the vehicle operation executed by the driving diagnostic system 10 of the present embodiment before opening the door will be described with reference to the flowchart of FIG. 8. The evaluation process shown in FIG. 8 is executed, for example, when an instruction to execute the process of evaluating the vehicle operation before opening the door is input.

In step S200, the CPU 30A acquires the acceleration and the steering angle of the vehicle during the event period as the vehicle operation information. Here, the event period of the evaluation process before the door is opened is a period until the door is opened that is predetermined for the vehicle 12.

In step S201, the CPU 30A uses the acquired vehicle operation information to derive the average vehicle speed, the steering angular acceleration, and the steering angular acceleration range (second range).

In step S202, the CPU 30A determines whether the acceleration of the vehicle is outside the first range. When the acceleration of the vehicle is outside the first range (step S202: YES), the process proceeds to step S203. On the other hand, when the vehicle acceleration is not outside the first range (the vehicle acceleration is within the first range) (step S202: NO), the CPU 30A proceeds to step S204.

In step S203, the CPU 30A evaluates the acquired vehicle operation information as a vehicle operation that requires caution.

In step S204, the CPU 30A determines whether the steering angular acceleration of the vehicle is outside the second range. When the steering angular acceleration of the vehicle is outside the second range (step S204: YES), the process proceeds to step S203. On the other hand, when the acceleration of the vehicle is not outside the second range (the steering angular acceleration is within the second range) (step S204: NO), the CPU 30A terminates the evaluation process before opening the door.

In the present embodiment, when the acceleration is outside the first range or the steering angular acceleration is outside the second range, the vehicle operation that requires caution is evaluated. However, the form is not limited to this. When the acceleration is outside the first range and the steering angular acceleration is outside the second range, the vehicle operation may be evaluated as a vehicle operation that requires caution The process of evaluating the vehicle operation executed by the driving diagnostic system 10 of the present embodiment after closing the door will be described with reference to the flowchart of FIG. 9. The evaluation process shown in FIG. 9 is executed, for example, when an instruction to execute the process of evaluating the vehicle operation after closing the door is input.

In step S300, the CPU 30A acquires the acceleration and the steering angle of the vehicle during the event period as the vehicle operation information. Here, the event period of the evaluation process after the door is closed is from when the door of the vehicle 12 is closed until a predetermined period elapses.

In step S301, the CPU 30A uses the acquired vehicle operation information to derive the average vehicle speed, the steering angular acceleration, and the steering angular acceleration range (second range).

In step S302, the CPU 30A determines whether the acceleration of the vehicle is outside the first range. When the acceleration of the vehicle is outside the first range (step S302: YES), the process proceeds to step S303. On the other hand, when the vehicle acceleration is not outside the first range (the vehicle acceleration is within the first range) (step S302: NO), the CPU 30A proceeds to step S304.

In step S303, the CPU 30A evaluates the acquired vehicle operation information as a vehicle operation that requires caution.

In step S304, the CPU 30A determines whether the steering angular acceleration of the vehicle is outside the second range. When the steering angular acceleration of the vehicle is outside the second range (step S304: YES), the process proceeds to step S303. On the other hand, when the acceleration of the vehicle is not outside the second range (the steering angular acceleration is within the second range) (step S304: NO), the CPU 30A proceeds to step S305.

In step S305, the CPU 30A determines whether the event period has passed. When the event period has passed (step S305: YES), the evaluation process after the door is closed ends. On the other hand, when the event period has not elapsed (if the time is within the event period) (step S305: NO), the CPU 30A proceeds to step S300 and acquires the vehicle operation information.

As described above, according to the present embodiment, it is possible to evaluate the driving before and after the door is opened and closed, and to detect the driving that requires caution and that hinders safe driving.

SUMMARY

The center server 30 serving as the driving diagnostic device of the present embodiment acquires the state information indicating the state of opening and closing of the door, detects the event indicating that the door is open or closed by using the state information, and performs the driving diagnosis in the event period until the door is opened or in the event period after the door is closed. As a result, it is possible to evaluate driving before and after the door is opened and closed, and to detect driving that requires caution and that hinders safe driving.

Remarks

In addition, in the present embodiment, the form in which the center server 30 is equipped with the driving diagnostic device has been described. However, the form is not limited to this. The vehicle-mounted device 20 mounted on the vehicle 12 may be a driving diagnostic device. For example, the vehicle-mounted device 20 may use that state information and the vehicle operation information acquired from the vehicle-mounted equipment 24 to detect the event and evaluate the vehicle operation, and transmit the evaluation result to the center server 30 or the like.

Moreover, in the preset embodiment, a form in which the first range and the second range are preset is described. However, the form is not limited to this. The first range and the second range may be set by the user, or a change by the user may be received.

Moreover, in the present embodiment, the form in which the vehicle-mounted device 20 collects the vehicle operation information from the vehicle-mounted equipment 24 such as a sensor via the ECU 22 has been described. However, the form is not limited to this. The vehicle-mounted equipment 24 may be connected to the vehicle-mounted device 20, and the vehicle-mounted device 20 may collect the vehicle operation information from the vehicle-mounted equipment 24.

Further, in the present embodiment, described is a form in which the evaluation result evaluated by the evaluation process is stored in the vehicle operation information DB 130 together with the vehicle operation information. However, the form is not limited to this. Depending on the evaluation result, a notification may be sent to the driver who is driving the vehicle. For example, when the center server 30 detects a driving operation that requires caution, the center server 30 may transmit a notification that the driving operation requires caution to the vehicle-mounted device 20, and the notification may be displayed on a monitor (not shown) connected to the vehicle-mounted device 20.

It should be noted that various processors other than the CPU may execute the various processes that are executed when the CPU 20A and the CPU 30A read the software (program) in the above embodiments. Examples of the processors in this case include a programmable logic device (PLD) such as a field-programmable gate array (FPGA) for which a circuit configuration can be changed after production, a dedicated electric circuit that is a processor having a circuit configuration designed exclusively for executing a specific process, such as an application specific integrated circuit (ASIC), and the like. Further, each process described above may be executed by one of these various processors, or by a combination of two or more processors of the same type or different types (for example, a combination of FPGAs, a combination of a CPU and an FPGA, and the like). Further, the hardware structure of each of the various processors is, more specifically, an electric circuit in which circuit elements such as semiconductor elements are combined.

Further, in the above embodiments, a mode in which each program is stored (installed) in a non-transitory computer-readable recording medium (storage medium) in advance has been described. For example, the collection program 100 in the vehicle-mounted device 20 is stored in advance in the ROM 20B, and the driving diagnostic program 120 in the center server 30 is stored in advance in the storage 30D. However, the present disclosure is not limited to this, and the program may be recorded on a non-transitory recording medium such as a compact disc read-only memory (CD-ROM), a digital versatile disc read-only memory (DVD-ROM), and a universal serial bus (USB) memory to be provided. Further, the program may be downloaded from an external device via a network.

The flow of processes described in the above embodiments is an example, and unnecessary steps may be deleted, new steps may be added, or the process order may be changed within a range that does not deviate from the gist.

What is claimed is:

1. A driving diagnostic device comprising:
a processor, wherein the processor
acquires state information indicating an open or closed state of a door of a vehicle from a sensor mounted on the vehicle in response to an actuator connected to the door opening or closing the door of the vehicle,
determines that there is an event that indicates a change in the state when the state information satisfies a predetermined condition, wherein the predetermined condition is a change from a closed state to an open state for the door of the vehicle,
evaluates a driving operation of the vehicle for a predetermined period of time following determination of the event,
acquires vehicle operation information indicating an operation of the vehicle and including a steering angle and a vehicle speed of the vehicle;
derives a steering angular acceleration indicating an acceleration of the steering angle from the vehicle operation information; and
determines the driving operation as a driving operation that requires caution when the steering angular acceleration is outside a second range, and
sets the second range in accordance with an average value of the vehicle speed.

2. The driving diagnostic device according to claim 1,
wherein the predetermined condition is a state in which the door changes from a closed state to an open state, and
wherein the processor:
determines that there is the event when the predetermined condition is satisfied; and
evaluates the driving operation with a predetermined period until the event occurs serving as a target period.

3. The driving diagnostic device according to claim 1,
wherein the predetermined condition is a state in which the door changes from an open state to a closed state, and
wherein the processor:
determines that there is the event when the predetermined condition is satisfied; and
evaluates the driving operation with a predetermined period after the event occurs serving as a target period.

4. The driving diagnostic device according to claim 1,
wherein the processor:
further acquires vehicle operation information indicating an operation of the vehicle and including an acceleration of the vehicle; and
evaluates the driving operation as a driving operation that requires caution when the acceleration is outside a predetermined first range.

5. The driving diagnostic device according to claim 1,
wherein the processor:
further acquires vehicle operation information indicating an operation of the vehicle and including an acceleration of the vehicle; and
evaluates the driving operation as a driving operation that requires caution when the acceleration is outside a predetermined first range and when the steering angular acceleration is outside the second range.

6. The driving diagnostic device according to claim 1, wherein when the processor detects that the state information is an open state and detects a state in which the vehicle is traveling, the processor performs notification that the vehicle is traveling in a state in which the door is open.

7. The driving diagnostic device according to claim 1, wherein the processor is configured to acquire the state information and the vehicle operation information via transmission over a wireless network.

8. The driving diagnostic device according to claim 1, wherein the processor is further configured to transmit instructions to a vehicle mount device to display a notification that vehicle operation requires caution in response to a determination that the steering angular acceleration is outside the second range.

9. The driving diagnostic device according to claim 1, wherein the processor is configured to evaluate the driving operation of the vehicle based on controls executed by an advanced driver assistance system (ADAS) during traveling of the vehicle.

10. The driving diagnostic device according to claim 9, wherein the controls executed by the ADAS include operation of a steering wheel of the vehicle used to control the steering angle of the vehicle.

11. A driving diagnostic method in which a computer executes processes comprising:
   acquiring state information indicating an open or closed state of a door of a vehicle from a sensor mounted on the vehicle in response to an actuator connected to the door opening or closing the door of the vehicle;
   determining that there is an event that indicates a change in the state when the state information satisfies a predetermined condition, wherein the predetermined condition is a change from a closed state to an open state for the door of the vehicle;
   evaluating a driving operation of the vehicle for a predetermined period of time following determination of the event;
   acquiring vehicle operation information indicating an operation of the vehicle and including a steering angle and a vehicle speed of the vehicle;
   deriving a steering angular acceleration indicating an acceleration of the steering angle from the vehicle operation information; and
   determining the driving operation as a driving operation that requires caution when the steering angular acceleration is outside a second range, and
   setting the second range in accordance with an average value of the vehicle speed.

12. The driving diagnostic method according to claim 11, wherein acquiring the state information and the vehicle operation information comprises acquiring the state information and vehicle operation information via transmission over a wireless network.

13. The driving diagnostic method according to claim 11, further comprising transmitting instructions to a vehicle mount device to display a notification that vehicle operation requires caution in response to a determination that the steering angular acceleration is outside the second range.

14. The driving diagnostic method according to claim 11, wherein evaluating the driving operation of the vehicle comprises evaluating the driving operation of the vehicle based on controls executed by an advanced driver assistance system (ADAS) during traveling of the vehicle.

15. The driving diagnostic method according to claim 14, wherein the controls executed by the ADAS include operation of a steering wheel of the vehicle used to control the steering angle of the vehicle.

16. A non-transitory storage medium that stores a driving diagnostic program that causes a computer to execute processes comprising:
   acquiring state information indicating an open or closed state of a door of a vehicle from a sensor mounted on the vehicle in response to an actuator connected to the door opening or closing the door of the vehicle;
   determining that there is an event that indicates a change in the state when the state information satisfies a predetermined condition, wherein the predetermined condition is a change from a closed state to an open state for the door of the vehicle;
   evaluating a driving operation of the vehicle for a predetermined period of time following determination of the event;
   acquiring vehicle operation information indicating an operation of the vehicle and including a steering angle and a vehicle speed of the vehicle;
   deriving a steering angular acceleration indicating an acceleration of the steering angle from the vehicle operation information; and
   determining the driving operation as a driving operation that requires caution when the steering angular acceleration is outside a second range, and
   setting the second range in accordance with an average value of the vehicle speed.

17. The non-transitory storage medium according to claim 16, wherein the processes comprise acquiring the state information and the vehicle operation information via transmission over a wireless network.

18. The non-transitory storage medium according to claim 16, wherein the processes comprise transmitting instructions to a vehicle mount device to display a notification that vehicle operation requires caution in response to a determination that the steering angular acceleration is outside the second range.

19. The non-transitory storage medium according to claim 16, wherein the processes comprise evaluating the driving operation of the vehicle based on controls executed by an advanced driver assistance system (ADAS) during traveling of the vehicle.

20. The driving diagnostic device according to claim 19, wherein the controls executed by the ADAS include operation of a steering wheel of the vehicle used to control the steering angle of the vehicle.

* * * * *